(12) United States Patent
Steger

(10) Patent No.: US 11,596,506 B2
(45) Date of Patent: Mar. 7, 2023

(54) METHOD FOR PRODUCING A DENTAL PROSTHESIS

(71) Applicant: Heinrich Steger, Bruneck (IT)

(72) Inventor: Heinrich Steger, Bruneck (IT)

(*) Notice: Subject to any disclaimer, the term of this patent is extended or adjusted under 35 U.S.C. 154(b) by 0 days.

(21) Appl. No.: 17/478,469

(22) Filed: Sep. 17, 2021

(65) Prior Publication Data
US 2022/0000594 A1 Jan. 6, 2022

Related U.S. Application Data

(63) Continuation of application No. PCT/EP2020/056048, filed on Mar. 6, 2020.

(30) Foreign Application Priority Data

Mar. 21, 2019 (AT) ............... A 50248/2019

(51) Int. Cl.
*A61C 13/087* (2006.01)
*A61C 13/00* (2006.01)
*A61C 13/10* (2006.01)
*C08J 7/02* (2006.01)

(52) U.S. Cl.
CPC ........ *A61C 13/087* (2013.01); *A61C 13/0004* (2013.01); *A61C 13/0022* (2013.01); *A61C 13/1003* (2013.01); *C08J 7/02* (2013.01); *C08J 2300/00* (2013.01)

(58) Field of Classification Search
CPC .............. A61C 13/087; A61C 13/0004; A61C 13/0022; A61C 13/1003; C08J 7/02; C08J 7/00
See application file for complete search history.

(56) References Cited

U.S. PATENT DOCUMENTS

| | | | |
|---|---|---|---|
| 3,036,026 A | 5/1962 | Cernia et al. | |
| 3,933,518 A * | 1/1976 | Vivian | C08J 7/02 106/311 |
| 4,650,550 A * | 3/1987 | Milnes | A61C 13/00 427/2.27 |
| 5,268,121 A | 12/1993 | Michaud | |
| 5,350,534 A | 9/1994 | Michaud | |

(Continued)

FOREIGN PATENT DOCUMENTS

| | | |
|---|---|---|
| AT | 516747 | 8/2016 |
| CN | 103524770 | 1/2014 |

(Continued)

OTHER PUBLICATIONS

International Search Report dated Jun. 18, 2020 in International (PCT) Application No. PCT/EP2020/056048.

(Continued)

*Primary Examiner* — Yogesh P Patel
(74) *Attorney, Agent, or Firm* — Wenderoth, Lind & Ponack, L.L.P.

(57) ABSTRACT

A method of producing a dental prosthesis produced from a gum part, and prosthetic teeth arranged on the gum part and connected to the gum part. The surface of the dental prosthesis is surface-treated, the surface treatment of the dental prosthesis involving a solvent, and the solvent containing at least one chlorohydrocarbon and at least one methane nitroderivative.

25 Claims, 2 Drawing Sheets

(56) References Cited

U.S. PATENT DOCUMENTS

Figure 1:
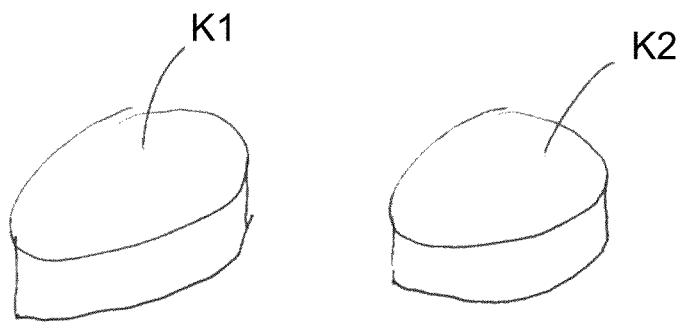

| | | | |
|---|---|---|---|
| 5,628,419 A * | 5/1997 | Putz | H02G 3/123 |
| | | | 220/3.9 |
| 5,928,419 A | 7/1999 | Uemura et al. | |
| 6,077,075 A | 6/2000 | Bedard et al. | |
| 6,355,706 B1 | 3/2002 | Rajaiah et al. | |
| 6,440,856 B1 * | 8/2002 | Bessho | B08B 3/08 |
| | | | 438/692 |
| 7,153,767 B2 * | 12/2006 | Nishikawa | B24B 37/042 |
| | | | 438/692 |
| 7,476,697 B2 | 1/2009 | Patacca et al. | |
| 10,213,020 B2 | 2/2019 | Lawson | |
| 10,383,443 B2 | 8/2019 | Lawson | |
| 10,390,621 B2 | 8/2019 | Lawson | |
| 10,427,364 B2 | 10/2019 | Alves | |
| 10,485,347 B2 | 11/2019 | Lawson et al. | |
| 10,945,928 B2 | 3/2021 | Yamamoto et al. | |
| 2003/0025228 A1 | 2/2003 | Prieur-Blanc et al. | |
| 2004/0102554 A1 | 5/2004 | Patacca et al. | |
| 2010/0330535 A1 | 12/2010 | Adusimilli et al. | |
| 2012/0097194 A1 * | 4/2012 | McDaniel | A01N 63/50 |
| | | | 435/197 |
| 2016/0317258 A1 | 11/2016 | Steger | |
| 2018/0118960 A1 * | 5/2018 | Sam | C09D 101/28 |
| 2018/0194086 A1 | 7/2018 | Alves | |
| 2018/0242741 A1 | 8/2018 | Lawson | |
| 2018/0242742 A1 | 8/2018 | Lawson et al. | |
| 2018/0242744 A1 | 8/2018 | Lawson | |
| 2018/0242746 A1 | 8/2018 | Lawson | |
| 2019/0290551 A1 | 9/2019 | Yamamoto et al. | |

FOREIGN PATENT DOCUMENTS

| | | |
|---|---|---|
| DE | 600 05 379 | 7/2004 |
| DE | 10 2017 200 191 | 7/2018 |
| EP | 0 534 829 | 3/1993 |
| EP | 2 066 258 B1 | 11/2016 |
| EP | 3 095 412 | 9/2018 |
| GB | 832055 | 4/1960 |
| JP | 55-21919 | 2/1980 |
| JP | 2-247107 | 10/1990 |
| JP | 5-140592 | 6/1993 |
| JP | 5-302098 | 11/1993 |
| JP | 6-166895 | 6/1994 |
| JP | 10-110111 | 4/1998 |
| JP | 2002-540897 | 12/2002 |
| JP | 2006-45094 | 2/2006 |
| JP | 2010-504825 | 2/2010 |
| JP | 2020-139138 | 9/2020 |
| KR | 2003-0068135 | 8/2003 |
| KR | 10-2010-0131460 | 12/2010 |
| WO | 2008/039544 | 4/2008 |
| WO | 2009/105672 | 8/2009 |
| WO | 2018/143051 | 8/2018 |
| WO | 2018/156240 | 8/2018 |

OTHER PUBLICATIONS

Ewart A. Swinyard, "Local Anesthetics", Remington's Pharmaceutical Sciences, Mack Publishing Co, USA, Jan. 1, 1990, XP002912256.

* cited by examiner

METHOD FOR PRODUCING A DENTAL PROSTHESIS

BACKGROUND OF THE INVENTION

The invention relates to a method for producing a dental prosthesis, wherein the dental prosthesis is produced from a gum part and prosthetic teeth arranged on the gum part and connected to the gum part, and the surface of the dental prosthesis is subjected to a surface treatment. In addition, the invention relates to a dental prosthesis, in particular produced using such a method, with a gum part and prosthetic teeth arranged on the gum part and connected to the gum part.

Dental prostheses are used in order to at least partly replace natural human teeth and natural human gum. Such dental prostheses are—in contrast to implants—not anchored in the human jawbone but are usually detachably fastened to an area of the jaw ridge without teeth by mostly gel-like adhesives. Such dentures are made e.g. of plastic. The dental prosthesis can be designed in the form of dentures or a (plastic) crown. An example of this is shown in AT 516 747 B1. In order to achieve an appealing optical result, the dentures are usually subjected to a surface treatment. For example, they are manually reworked, cleaned and polished. The polishing serves particularly to make the surface appear shiny and smooth. In addition, fewer contaminants can stick to and fewer bacteria can become implanted on a polished surface.

Until now, polishing in the dental field has been carried out by manually rubbing or grinding the surface, whereby unevennesses, grooves and scratches are smoothed and levelled out. During this rubbing or grinding, however, it can indeed happen that, especially at less easily accessible points of the dental prosthesis, undesired depressions and grooves still remain, which on the one hand detracts from the optical impression and on the other hand can more readily lead to contaminations.

SUMMARY OF THE INVENTION

The object of the present invention is therefore to develop an improved method compared with the state of the art. In particular, the surface of the dental prosthesis is to become as smooth and shiny as possible. In addition, the surface treatment is to be able to be carried out as easily as possible.

Therefore, according to the invention, the surface treatment of the dental prosthesis is effected with a (liquid) solvent. The solvent contains at least one chlorinated hydrocarbon, preferably at 50 percent by weight to 80 percent by weight, and at least one nitro derivative of methane, preferably at 15 percent by weight to 45 percent by weight. In such a method, no material-removing method (e.g. rubbing or grinding) is used, but rather a chemical solvent is applied. This solvent thus acts as a polishing agent. On the one hand, this solvent seals small unevennesses, grooves and depressions, on the other hand, the composition of the solvent produces a shiny surface. Furthermore, the depositing or application of the solvent is relatively easy and quick to carry out. Specifically, the solvent is capable of opening or breaking polymer chains of the materials of the dental prosthesis and realigning them.

The gum part can be produced from pre-fabricated standard components. The prosthetic teeth can be obtained ready-made or pre-fabricated. This means that no machining of the prosthetic teeth is done by the dental technician. However, it is preferable that the production of the dentures comprises the steps of producing the gum part by machining a first blank, producing the prosthetic teeth by machining at least one second blank, and connecting the prosthetic teeth to the gum part to form the dental prosthesis, in particular to form the dentures.

The machining of the prosthetic teeth and/or the gum part can be effected in a material additive manner (e.g. by 3D printing). However, preferably the machining is carried out in a material-removing manner. It is particularly preferable that the machining of the prosthetic teeth and/or the gum part is effected by milling or grinding. Corresponding tools are used for this. This machining can be effected in an automated manner in a CNC machine.

In principle, it is possible for the prosthetic teeth and the gum part to be formed in one piece or in one part. This means that the dental prosthesis is carved out of one blank. However, as the (reddish or flesh-coloured) gum part and the (whitish or tooth-coloured) prosthetic teeth are to have different colours in the end product, blanks with different starting materials or with different optical (e.g. colour), thermal, mechanical or chemical properties are used. In addition, the starting material can contain dyes. The dyes can be diffused into the material.

The connection of the prosthetic teeth to the gum part can be effected in principle in a friction-locking or positive-locking manner. However, a material-bonding connection, for example by gluing, preferably diffusion bonding, with a suitable adhesive is preferably provided.

According to a preferred embodiment, the connection of the prosthetic teeth to the gum part is effected by the solvent. The solvent thus has a double function: on the one hand, it acts as a polishing agent for polishing or smoothing the surface; on the other hand, it acts as an adhesive for connecting the gum part to the prosthetic teeth.

The prosthetic teeth and the gum part have contact areas via which the prosthetic teeth and the gum part contact each other in the assembled state. The connection is then effected by depositing the solvent on the contact area of the gum part and/or of the prosthetic teeth before assembly. The gum part and the prosthetic teeth are then assembled or pressed together. The polymer chains of the two contact areas (can also be called joining surfaces) permeate each other and entangle with each other. After the remaining solvent has disappeared, physical interactions form between the polymer chains, and a cohesion zone forms between the two parts being joined (gum part and prosthetic teeth). As, in this method, no adhesion zone forms and the polymer chains of the surfaces diffuse into the opposite part being joined, this here is referred to as diffusion bonding.

Preferably, the first blank for the gum part and/or the second blank for the prosthetic teeth consists/consist of a plastic, preferably thermoplastic. Specific examples of this are PMMA, PC, ABS, PE, PP, PEEK, PA, POM, PVDF, PET, PBT and the like. The plastic blanks can also be constructed in several layers or several colours.

Chlorinated hydrocarbons form a substance group of organic compounds and a sub-group of halocarbons. These chemical substances have a hydrocarbon skeletal structure, in which one or more hydrogen atoms are replaced by chlorine. According to a preferred embodiment, the at least one chlorinated hydrocarbon is selected from the group chloroform, 1,2-dichloroethane, dichloromethane, trichloroethylene, acetyl chloride and mixtures thereof.

Furthermore, it is preferable that the at least one nitro derivative of methane is selected from the group nitromethane, dinitromethane, trinitromethane, tetranitromethane and mixtures thereof.

According to a further preferred embodiment, the solvent contains up to 10 percent by weight, preferably between 0.1 percent by weight and 10 percent by weight, ethanol or derivatives thereof. Ethanol is an aliphatic, monohydric alcohol with the empirical formula $C_2H_6O$. It is preferable that the ethanol, or derivatives thereof, is selected from the group ethanol, acetic acid, acetaldehyde, ethyl acetate, diethyl ether, formic acid ethyl ester and mixtures thereof.

Preferably, the solvent contains up to 7.5 percent by weight, preferably between 0.1 percent by weight and 7.5 percent by weight, aromatics or alcohols thereof or ethers of alcoholic aromatics. Aromatic compounds, also called aromatics for short, are a substance class in organic chemistry.

In chemistry ether denotes organic compounds which have an ether group—an oxygen atom which is substituted with two organyl radicals—as functional group. The solvent preferably contains constituents selected from the group benzene, benzyl alcohol, phenoxyethanol, catechol, resorcinol, hydroquinone and mixtures thereof.

Preferably, the solvent contains up to 4 percent by weight, preferably between 0.1 percent by weight and 4 percent by weight, cycloalkanes or heterocyclic compounds thereof. The cycloalkanes are a substance group of cyclic saturated hydrocarbons. The rings can carry side chains. In the classification of organic chemistry, they belong to the alicyclic compounds. The cycloalkanes or oxiranes thereof are preferably selected from the group cyclohexane, cyclopentane, oxane, oxalan, oxetane and mixtures thereof.

Specifically, the solvent (only) contains the constituents dichloromethane at 65 percent by weight to 85 percent by weight, nitromethane at 15 percent by weight to percent by weight, ethanol at 2 percent by weight to 4 percent by weight and phenoxyethanol at 1 percent by weight to 3 percent by weight.

The solvent particularly preferably contains specifically:
dichloromethane at 75 percent by weight,
nitromethane at 20 percent by weight,
ethanol at 3 percent by weight and
phenoxyethanol at 2 percent by weight.

The surface treatment can in principle be effected in any desired manner. Three preferred variants are listed in the following, which are particularly well suited to the present invention.

According to a first variant, the surface treatment is effected by painting the dental prosthesis with the solvent. Specifically, the steps of depositing the solvent on the dental prosthesis with a brush, leaving the solvent to act, preferably for approximately 30 seconds to 3 minutes, and rinsing the surface of the dental prosthesis with water are provided in this variant.

According to a second variant, the surface treatment is effected by dipping the dental prosthesis into the solvent. Specifically, the steps of dipping the dental prosthesis into the solvent, preferably for one second to 30 seconds, drying the dental prosthesis, preferably by compressed air, and cleaning the surface of the dental prosthesis, preferably for approximately one minute and preferably with ultrasound, are provided in this variant.

According to a third variant, the surface treatment is effected by vapor deposition of the solvent on the dental prosthesis. Specifically, the steps of introducing the dental prosthesis into a, preferably airtight, vapor-deposition chamber, closing the vapor-deposition chamber, optionally lowering the pressure in the vapor-deposition chamber, letting the solvent into the vapor-deposition chamber, which leads to a vaporization of at least some of the solvent. The solvent vapor condenses on the surface of the dental prosthesis, leaving the solvent to act, preferably for at least 30 seconds, opening the vapor-deposition chamber and removing the polished dental prosthesis from the vapor-deposition chamber are provided in this variant. If the vapor-deposition chamber is not airtight, the solvent can also be introduced into the vapor-deposition chamber with a vaporizer (thermal or mechanical, e.g. by means of a piezo element) with a positive pressure. A general, non-generic document, which shows the application of polishing vapor to 3D articles, is WO 2018/156240 A1. A similar, but likewise non-generic, document is DE 10 2017 200 191 A1, which shows the smoothing of a surface of an item formed of a plastic for a motor vehicle.

As a fourth variant, it is also possible for the surface treatment to be effected by spraying the solvent onto the dental prosthesis.

Protection is also sought for a dental prosthesis, with a gum part and prosthetic teeth arranged on the gum part and connected to the gum part. According to the invention, a solvent is applied to the surface of the dental prosthesis, and this solvent contains a chlorinated hydrocarbon, preferably at 50 percent by weight to 80 percent by weight, and a nitro derivative of methane, preferably at 15 percent by weight to 45 percent by weight. It is preferable that this dental prosthesis is produced using a method according to the invention.

Furthermore, the invention relates to a solvent for a dental prosthesis, wherein the solvent contains at least one chlorinated hydrocarbon, preferably at 50 percent by weight to 80 percent by weight, and at least one nitro derivative of methane, preferably at 15 percent by weight to 45 percent by weight, as constituents. Preferred embodiments of this solvent have already been described further above. Finally, protection is also sought for the use of this solvent for the surface treatment, in particular for the polishing, and for the connection of constituents of a dental prosthesis in a method for producing the dental prosthesis.

BRIEF DESCRIPTIONS OF THE DRAWINGS

Figure 2:
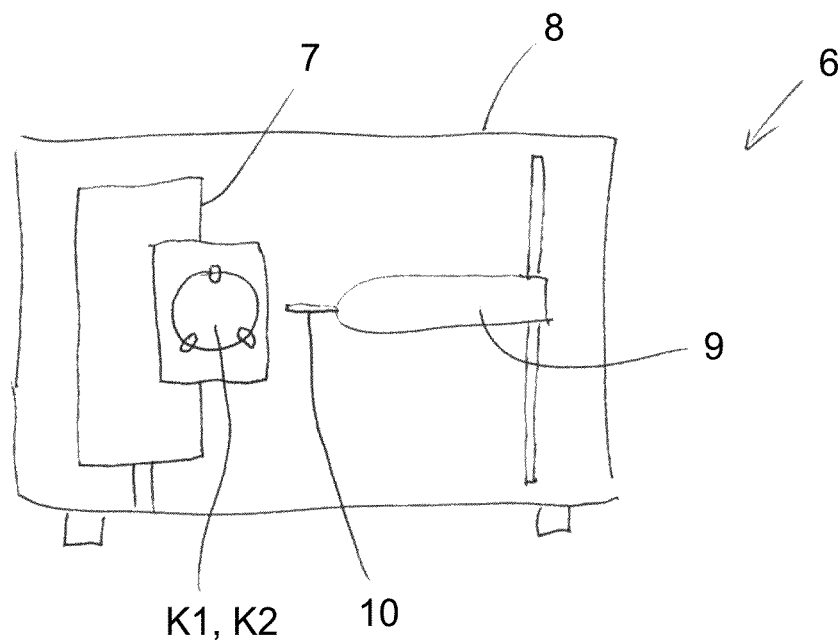
Figure 3:
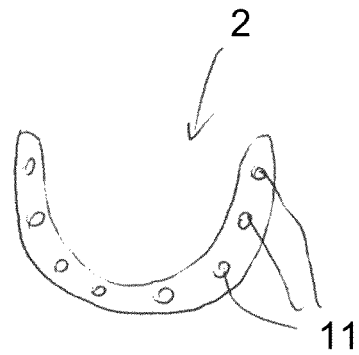
Figure 4:
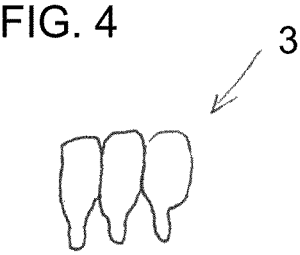
Figure 5:
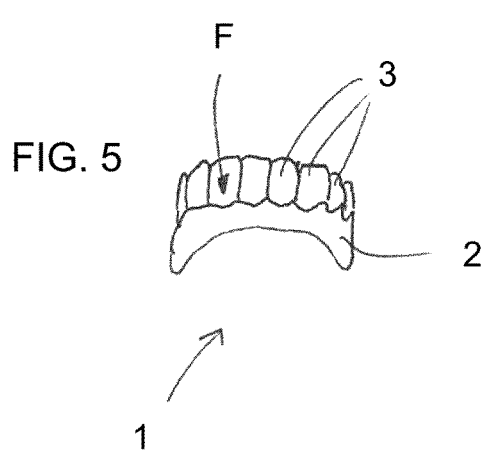
Figure 6:
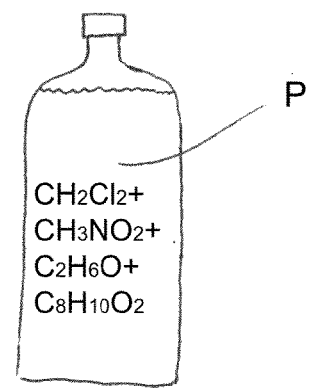
Figure 7:
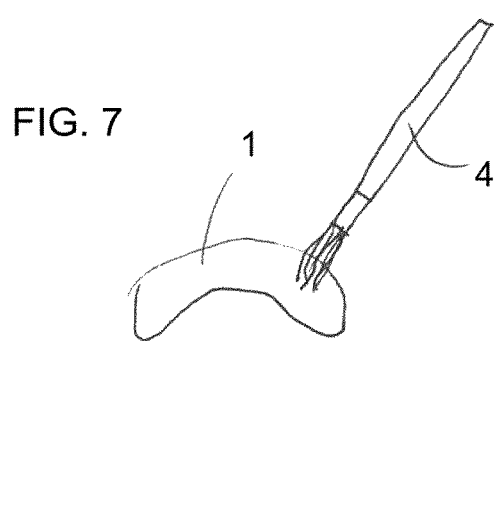
Figure 8:
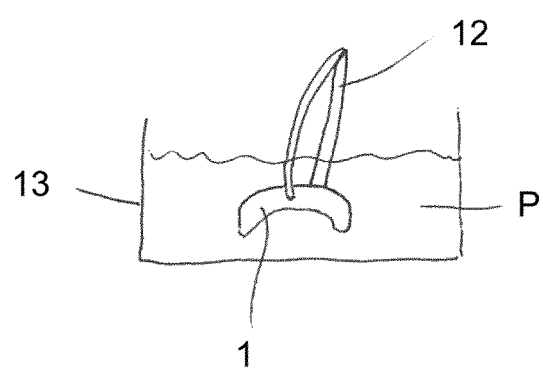
Figure 9:
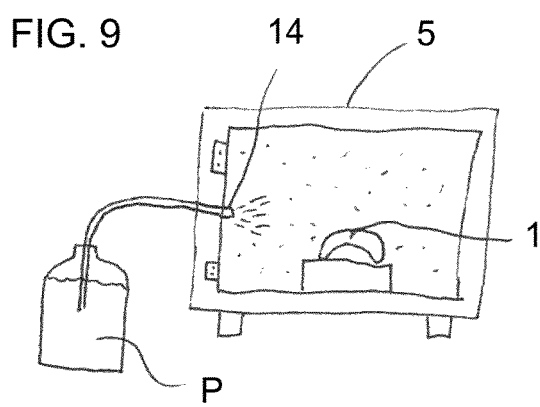
Figure 10:

Further details and advantages of the present invention are explained in more detail below with the aid of the description of the figures with reference to the embodiments represented in the drawings, in which:

FIG. 1 shows two plastic blanks schematically,
FIG. 2 shows a CNC machine with a fixed plastic blank,
FIG. 3 shows a gum part with recesses,
FIG. 4 shows several prosthetic teeth,
FIG. 5 shows a dental prosthesis consisting of a gum part and prosthetic teeth,
FIG. 6 shows a bottle filled with solvent,
FIG. 7 shows a dental prosthesis with brush during the depositing of solvent,
FIG. 8 shows a dip tank with dental prosthesis dipped in,
FIG. 9 shows a dental prosthesis in a vapor-deposition chamber, and
FIG. 10 shows a polished, shiny and smooth dental prosthesis.

DETAIL DESCRIPTION OF THE INVENTION

FIG. 1 shows two plastic blanks K1 and K2. In principle, these can have any desired shape. These plastic blanks K1 and K2 are preferably formed disc-shaped. The first plastic blank K1 has a reddish, preferably flesh-coloured, colour.

The gum part 2 is carved out of this. The second plastic blank K2 has a whitish to beige colour. The prosthetic teeth 3 are carved out of this.

FIG. 2 schematically shows a CNC machine 6. This has a housing 8, a holder 7 movable relative to the housing 8, for a plastic blank K1 or K2 and a machining device 9 with a machining tool 10 for machining the plastic blank K1 or K2. To produce the dental prosthesis 1 the plastic blanks K1 and K2 are fixed in the holder 7 and machined by the machining device 9 in a material-removing manner on the basis of stored data or data definable by a dental technician. As an example of such a machine, reference can be made to EP 3 095 412 B1.

FIG. 3 schematically shows a gum part 2, which has been carved out of the first plastic blank K1. Several recesses 11 (or depressions) for attaching prosthetic teeth 3 are formed in this gum part 2.

FIG. 4 shows several prosthetic teeth 3, which have been carved out of the second plastic blank K2. These prosthetic teeth 3 in this case are formed in one piece. However, several individual pieces, each forming a prosthetic tooth 3, can also be carved out of the second plastic blank K2.

FIG. 5 shows an assembled dental prosthesis 1 in the form of dentures, wherein the prosthetic teeth 3 are connected, preferably glued, to the gum part 2. The surface F of the dental prosthesis 1 is still relatively rough and matte because of the rather coarse machining with the machining tool 10.

A solvent P is used for the surface treatment of the dental prosthesis 1. FIG. 6 schematically shows a bottle, which is filled with such a liquid solvent P. This solvent P contains at least one chlorinated hydrocarbon at 50 percent by weight to 80 percent by weight and at least one nitro derivative of methane at 15 percent by weight to 45 percent by weight. Specifically, this solvent P contains at least dichloromethane ($CH_2Cl_2$) and nitromethane ($CH_3NO_2$). In addition, this solvent P preferably contains ethanol ($C_2H_6O$) and phenoxyethanol ($C_8H_{10}O_2$).

FIG. 7 schematically shows the surface treatment by painting. Specifically, the solvent P is deposited on the surface F of the dental prosthesis 1 with a brush 4. After the solvent has been left to act and has cured, the dental prosthesis 1 is rinsed with water.

FIG. 8 schematically shows the surface treatment by dipping the dental prosthesis 1 into the liquid solvent P. For this purpose, the dental technician takes the dental prosthesis 1 with a suitable tool 12, for example in the form of tongs, and dips the dental prosthesis 1 into a dip tank 13 filled with solvent P. This dipping can last approx. 1 to 30 seconds. In the process the dental prosthesis 1 is turned in the solvent P. A drying of the dental prosthesis 1 is then effected with compressed air (preferably at 4 to 6 bar). After the drying, the dental prosthesis is cleaned for approx. 1 minute using ultrasound.

FIG. 9 schematically shows a sealable vapor-deposition chamber 5. First, the dental prosthesis 1 is placed in the vapor-deposition chamber 5 (or optionally held in a movable holder). Then, the vapor-deposition chamber 5 is closed and a negative pressure is generated in the vapor-deposition chamber 5. Then, solvent P is sprayed into the vapor-deposition chamber 5 via a nozzle 14, whereby a solvent mist or vapor forms in the vapor-deposition chamber 5. This solvent mist or solvent vapor condenses on or wets the surface F of the dental prosthesis 1. After a sufficient exposure time, the solvent mist is extracted by suction, the vapor-deposition chamber 5 is opened and the polished dental prosthesis 1 is removed.

Finally, FIG. 10 schematically shows a dental prosthesis 1 with a gum part 2 and prosthetic teeth 3 arranged on the gum part 2 and connected to the gum part 2, wherein the solvent P is applied to the surface F of the dental prosthesis 1. As a result, the surface F is shiny and as smooth as possible.

LIST OF REFERENCE NUMBERS 1 dental prosthesis
2 gum part
3 prosthetic teeth
4 brush
5 vapor-deposition chamber
6 CNC machine
7 holder
8 housing
9 machining device
10 machining tool
11 recesses
12 tool
13 dip tank
14 nozzle
F surface of the dentures
P solvent
K1 first plastic blank
K2 second plastic blank

The invention claimed is:

1. A method for producing a dental prosthesis,
forming a dental prosthesis by providing a gum part and prosthetic teeth arranged on the gum part and connected to the gum part; and
subjecting a surface of the dental prosthesis to a surface treatment, the surface treatment of the dental prosthesis being effected with a solvent, and the solvent containing a chlorinated hydrocarbon and a nitro derivative of methane.

2. The method according to claim 1, wherein the solvent contains the chlorinated hydrocarbon at 50 to 80 percent by weight and the nitro derivative of methane at 15 to 45 percent by weight.

3. The method according to claim 1, wherein the forming of the dental prosthesis further comprises:
producing the gum part by machining a first plastic blank;
producing the prosthetic teeth by machining a second plastic blank; and
connecting the prosthetic teeth to the gum part to form the dental prosthesis.

4. The method according to claim 3, wherein the connecting of the prosthetic teeth to the gum part is effected by the solvent.

5. The method according to claim 4, wherein the prosthetic teeth and the gum part have contact areas-via at which the prosthetic teeth and the gum part contact each other in the assembled state, wherein the connecting comprises depositing the solvent on the contact area of the gum part and/or of the prosthetic teeth before assembly.

6. The method according to claim 1, wherein the chlorinated hydrocarbon is selected from a group consisting of chloroform, 1,2-dichloroethane, dichloromethane, trichloroethylene, acetyl chloride, and mixtures thereof.

7. The method according to claim 1, wherein the nitro derivative of methane is selected from a group consisting of nitromethane, dinitromethane, trinitromethane, tetranitromethane, and mixtures thereof.

8. The method according to claim 1, wherein the solvent contains up to 10 percent by weight ethanol or derivatives thereof.

9. The method according to claim 1, wherein the solvent contains up to 7.5 percent by weight aromatics or alcohols thereof or ethers of alcoholic aromatics.

10. The method according to claim 1, wherein the solvent contains up to 4 percent by weight cycloalkanes or heterocyclic compounds.

11. The method according to claim 1, wherein the solvent contains:
dichloromethane at 65 percent by weight to 85 percent by weight,
nitromethane at 15 percent by weight to 25 percent by weight,
ethanol at 2 percent by weight to 4 percent by weight, and
phenoxyethanol at 1 percent by weight to 3 percent by weight.

12. The method according to claim 1, wherein the subjecting the surface of the dental prosthesis to the surface treatment comprises painting the dental prosthesis with the solvent.

13. The method according to claim 12, wherein the painting comprises:
depositing the solvent on the dental prosthesis with a brush;
leaving the solvent to act for a period of time, and
rinsing the surface of the dental prosthesis with water.

14. The method according to claim 1, wherein the subjecting the surface of the dental prosthesis to the surface treatment comprises dipping the dental prosthesis into the solvent.

15. The method according to claim 14, wherein the dipping comprises:
dipping the dental prosthesis into the solvent for a period of time;
drying the dental prosthesis; and
cleaning the surface of the dental prosthesis.

16. The method according to claim 1, wherein the subjecting the surface to the surface treatment comprises vapor deposition of the solvent on the dental prosthesis.

17. The method according to claim 16, wherein the vapor deposition comprises:
introducing the dental prosthesis into a vapor-deposition chamber; closing the vapor-deposition chamber;
introducing the solvent into the vapor-deposition chamber so as to produce a vaporization of at least some of the solvent, whereby solvent vapor condenses on the surface of the dental prosthesis;
leaving the solvent to act for a period of time;
opening the vapor-deposition chamber; and
removing the dental prosthesis from the vapor-deposition chamber.

18. The method according to claim 3, wherein the producing the gum part comprises milling the first plastic blank, the producing the prosthetic teeth comprises milling the second plastic blank, and the connecting of the prosthetic teeth to the gum part comprises gluing the prosthetic teeth to the gum part.

19. The method according to claim 8, wherein the solvent contains between 0.1 percent by weight and 10 percent by weight ethanol or derivatives thereof selected from a group consisting of ethanol, acetic acid, acetaldehyde, ethyl acetate, diethyl ether, formic acid ethyl ester, and mixtures thereof.

20. The method according to claim 9, wherein the solvent contains between 0.1 percent by weight and 7.5 percent by weight of aromatics or alcohols thereof or ethers of alcoholic aromatics selected from a group consisting of benzene, benzyl alcohol, phenoxyethanol, catechol, resorcinol, hydroquinone, and mixtures thereof.

21. The method according to claim 10, wherein the solvent contains between 0.1 percent by weight and 4 percent by weight of cycloalkanes or heterocyclic compounds selected from a group consisting of cyclohexane, cyclopentane, oxane, oxalan, oxetane, and mixtures thereof.

22. The method according to claim 11, wherein the solvent comprises dichloromethane at 75 percent by weight, nitromethane at 20 percent by weight, ethanol at 3 percent by weight, and phenoxyethanol at 2 percent by weight.

23. The method according to claim 13, wherein the solvent is left to act for a time period in a range of 30 seconds to 3 minutes.

24. The method according to claim 15, wherein the dipping of the dental prosthesis into the solvent is done for a period of time in a range of 1 second to 30 seconds, the drying of the dental prosthesis is performed by applying compressed air, and the cleaning of the surface of the dental prosthesis is done for a period of 1 minute with ultrasound.

25. The method according to claim 17, wherein the dental prosthesis is introduced into an airtight vapor-deposition chamber and the pressure in the vapor-deposition chamber is lowered, and the solvent is left to act for a period of at least 30 seconds.

* * * * *